Nov. 21, 1933.  R. R. LEFFLER  1,936,305
APPARATUS FOR TREATMENT OF LIQUIDS WITH GASEOUS FLUIDS
Filed Jan. 18, 1933  2 Sheets-Sheet 1

Inventor:
Ralph R. Leffler.
By Dyrenforth, Lee, Chritton & Wiles
Attys.

Nov. 21, 1933.    R. R. LEFFLER    1,936,305
APPARATUS FOR TREATMENT OF LIQUIDS WITH GASEOUS FLUIDS
Filed Jan. 18, 1933    2 Sheets-Sheet 2
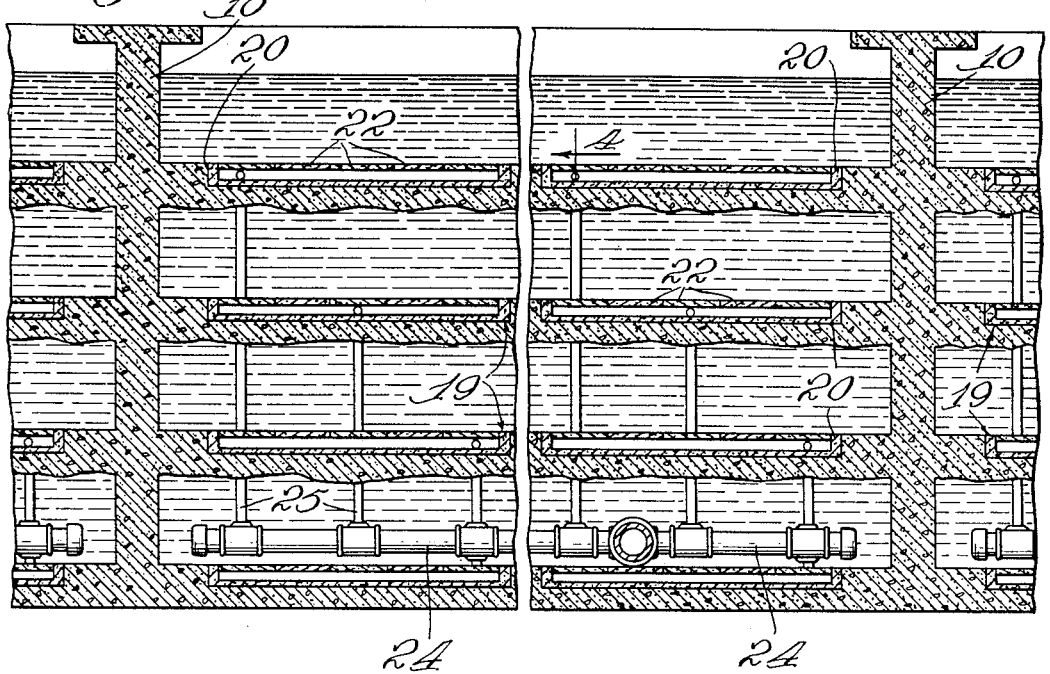
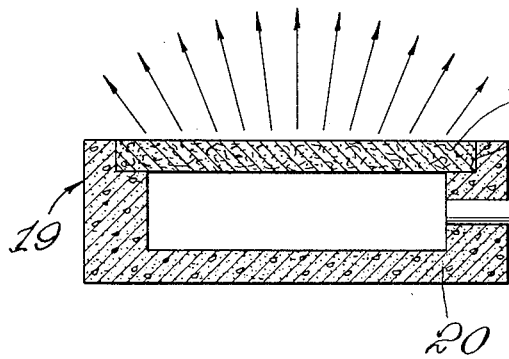
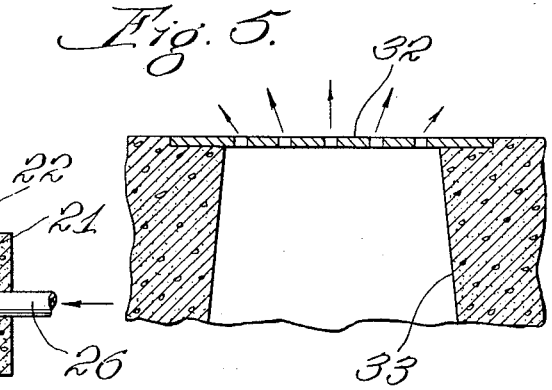
Inventor:
Ralph R. Leffler.
By Dyrenforth, Lee, Chritton and Wiles
Attys.

Patented Nov. 21, 1933

1,936,305

UNITED STATES PATENT OFFICE 1,936,305

APPARATUS FOR TREATMENT OF LIQUIDS WITH GASEOUS FLUIDS

Ralph R. Leffler, Chicago, Ill.

Application January 18, 1933. Serial No. 652,407

4 Claims. (Cl. 261—123)

My invention relates generally to the treatment of liquid with gaseous fluid, but more particularly to the treatment with gaseous fluid, such as air, of liquids containing more or less solid matter, such as sewage from which the large bodies of solid matter have been removed and activated sludge added thereto, to render the liquid, in the case of sewage, substantially innocuous.

Certain of my objects are to reduce the expense of, and expedite, such treatment; to reduce the size and cost of apparatus necessary for treating a given amount of liquid within a given length of time; to provide for the utilization of the gaseous fluid to a much higher degree than hitherto possible; to provide for the broad, intimate and intense continued contact of the liquid with gaseous fluid to which it is to be treated to thereby more fully effect the desired interaction between the liquid and the gaseous fluid; and other objects as will be manifest from the following description.

Referring to the accompanying drawings:

Figure 3 is a broken cross sectional view of the apparatus.

Figure 4 is an enlarged sectional view showing one of the similar diffusers through which the gaseous fluid for treating the liquid is forced into the latter; and Figure 5, a broken sectional view of one of the similar outlets for gaseous fluid entrained in the liquid.

Figure 1:
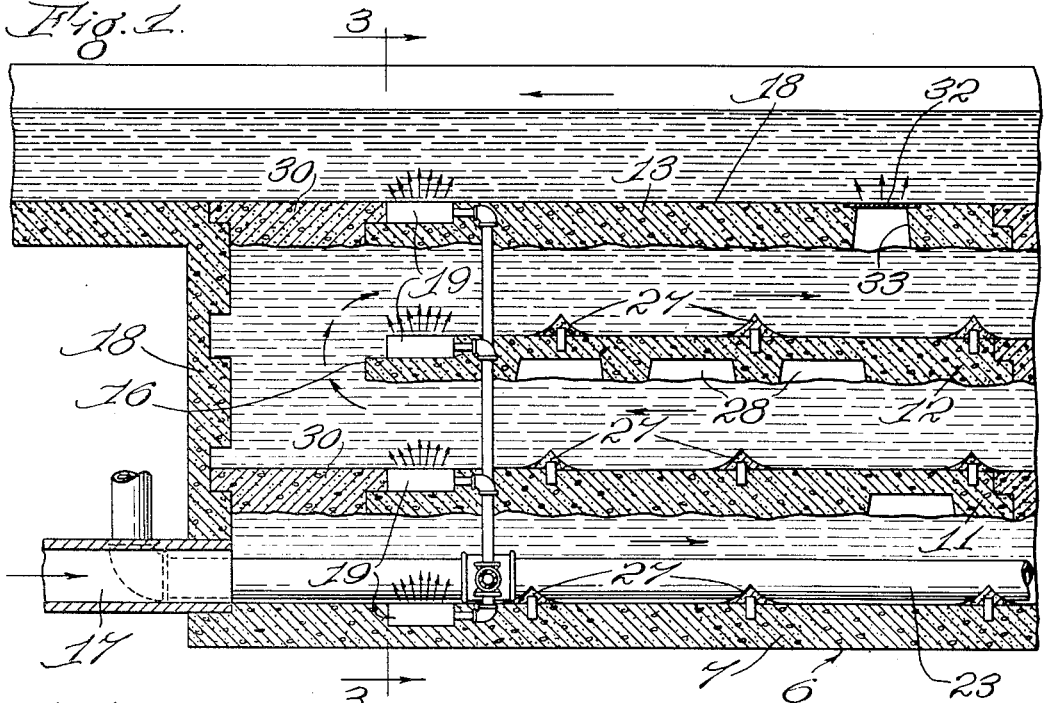
Figure 1 is a view in broken sectional elevation of the liquid inlet end of liquid treating apparatus constructed in accordance with my invention and suitable for practicing my improved method more particularly in the treatment of sewage.

The particular apparatus shown comprises a hollow substantially rectangular structure 6, as for example of concrete, formed of a bottom wall 7, end walls 8 and 9 and side walls. Rising from the bottom wall 7 and extending lengthwise of the structure 6 are substantially parallel partition-forming walls 10 of any desirable number, two being shown, spaced apart and from the side walls referred to a substantially uniform distance; and between the partitions 10 and these partitions and the side walls referred to are vertical series of parallel horizontal walls of any desired number, each of the series in the construction shown comprising three of such walls represented at 11, 12 and 13, equidistantly spaced apart and from the bottom wall 7 as shown, the walls 11 and 13 reaching short of the end wall 9 and the wall 12 short of the end wall 8 to provide the spaces indicated at 14, 15 and 16.

There is thus provided in each space between adjacent partitions 10 and these partitions and the side walls of the structure 6, a tortuous conduit, forming a course for the liquid to be treated, composed of a vertical series of conduit portions interconnected at their ends in series, the liquid being introduced, as for example by the action of a pump (not shown), into each conduit at one end of the lower conduit portion thereof, as through a pipe 17 (one such pipe only being shown and one, by preference, being provided for each conduit) and the liquid, treated in its passage through the conduit, discharged from the end of the uppermost conduit portion into a trough 18 the bottom of which is formed of the roof 13 of the uppermost conduit portion, for discharge therefrom to any suitable place of discharge.

The several conduits are of relatively great width compared with their depth and preferably are of a length suitable for ensuring the subjecting of the liquid to the treating gaseous fluid, supplied thereto as hereinafter described, for the length of time necessary to effect the desired treatment.

As an example of a structure for the treatment of sewage, but by way of illustration only, each conduit-portion, three of which are shown as comprising each conduit, would be about 24 feet wide, about 2 to 6 feet high and about 400 feet long, the sewage, properly seeded with activated sludge, being pumped into the inlets of the conduits.

The apparatus also comprises means for introducing into the liquid the gaseous fluid by which the liquid is to be treated, these means, adapted for the introduction of the gaseous fluid at desired intervals along each conduit, being indicated generally at 19 and comprising hollow blocks 20, as for example of concrete, open at their tops and positioned in recesses 21 in the floor and roof portions of the conduits, and slabs 22 of porous material such, for example, as used in the air-diffusing devices of sewage-treating apparatus as commonly provided, closing the upper open ends of the blocks 21.

Figure 2:
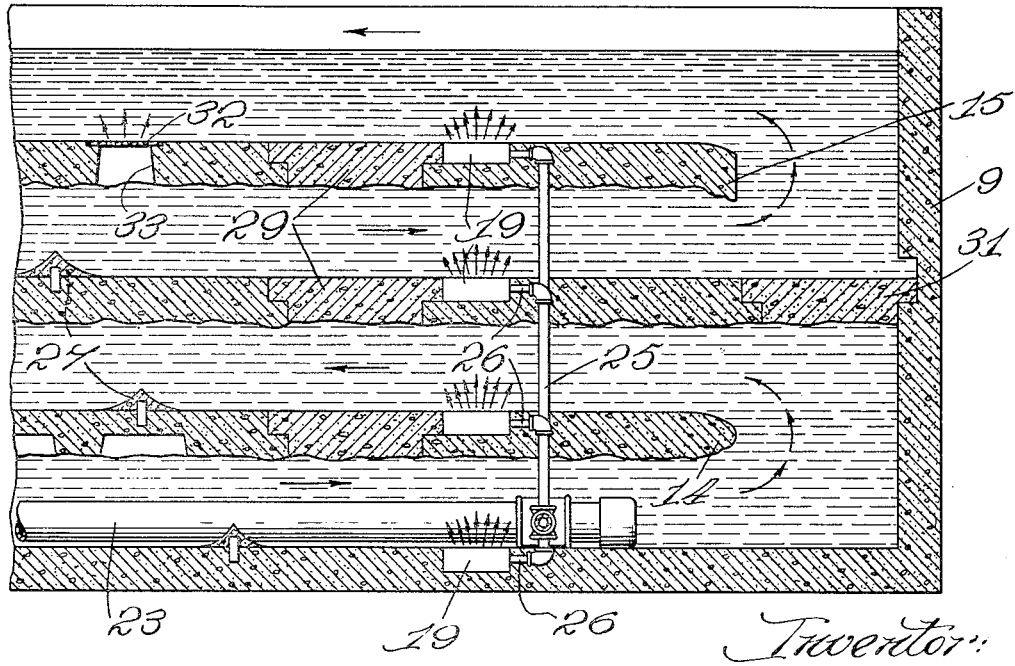
Figure 2 is a view like Fig. 1 of the opposite end of the apparatus.

The devices 19, provided in the particular apparatus shown not only to introduce gaseous fluid into the liquid in the conduits, but also into the liquid in the troughs 18, are preferably grouped together in rows extending crosswise of the conduits and disposed in a vertical series at each location thereof as shown at the terminals of the conduit portions in Figs. 1, 2 and 3.

The gaseous fluid is supplied to the diffusing devices 19 for each conduit, under sufficient pressure, through a main 23 shown as located in the lowermost one of the conduit portions and connected with the spaces within the blocks 21 by means of a system of piping shown as comprising laterals 24, risers 25 and branch pipes 26.

As will be understood from the foregoing description, the gaseous fluid introduced into the liquid is caused to intermix with the latter and travel with it in the conduits thereby continuing its action on the liquid. To augment the interaction between the liquid and the gaseous fluid I provide for the disturbing of the even flow of the liquid in the conduit, producing an agitation of the liquid, as by roughening certain of the inner surfaces of the conduit-portions preferably the under surfaces of the roofs and the upper surfaces of the bottom walls thereof.

The roughening of the upper surfaces of the bottom walls of the conduit-portions is preferably relatively coarse and is provided for by providing prominent projections of any desirable shape on these surfaces such, as for example, as illustrated at 27, and which may extend continuously across the floors or only at intervals. The roughening of the undersurfaces of the roof portions of the conduit-portions is preferably relatively fine as illustrated in the drawings and is provided, in the case of a structure of concrete, by forming these surfaces rough as in the case of a "concrete pavement" finish with corrugations, preferably irregular as shown, these surfaces also containing, at intervals along the conduit-portions, relatively shallow and long recesses 28, which may extend substantially the full width of the conduit.

As will be understood the provision of the irregularities in the bottom and upper surfaces of the conduit-portions, results in the very effective intimate and minute intermingling or intermixing of the gaseous fluid with the liquid in the flow of the former with the latter along the courses provided by the conduits and consequently a high degree of interaction therebetween; the solidarity and continuity of the elemental lines of flow of the liquid being broken up and interrupted, the bubbles of gaseous fluid rising to the upper surface of the liquid being jostled by rubbing along the rough upper surfaces of the conduit portions and thus more minutely and intimately mixing with the liquid; and portions of the gaseous fluid collecting in the shallow recesses 28 affording large area surface contact with the liquid beneath and encouraging spraying and foaming.

The horizontal walls 11, 12 and 13 are provided with removable and replaceable floor sections adjacent the vertical series of diffusers 19, those shown as located adjacent the diffusers in Fig. 2 being represented at 29 and those adjacent the diffusers in Fig. 1 at 30, another removable floor section being represented at 31. Thus easy access may be had to the diffusers as for example for purposes of removal for substitution.

Furthermore, by the arrangement shown the removable floor sections at the ends of the floors afford means whereby the liquid, instead of flowing in series through the several conduit portions, may, if desired, be caused to flow in parallel through pairs of the conduit portions, thus doubling the quantity of liquid treated under the same velocity of flow and which may be found desirable where the liquid being treated does not require the prolonged treatment resulting from the single series flow through the conduit-portions as shown in the illustrated arrangement.

Should it be found desirable in the use of the apparatus to increase the velocity of flow of the liquid a false floor or floors suitably roughened as described may be installed in the conduit-portions to reduce their height. Furthermore it may be found desirable to provide the conduit portions of different heights to provide for different velocity flow through the several conduit-portions.

In the construction shown, wherein the liquid discharges from the conduit portions into the trough portions and thus to the atmosphere, it is desirable that means be provided to prevent the forceful blowing of the liquid out of the troughs, as it enters them, by the built-up or entrained pressure of gaseous fluid introduced therein through the diffusers 19. As suitable means for this purpose I provide vents 32 disposed at intervals along the horizontal walls 13 (two only being shown) whereby each serves to partially vent the gaseous fluid entrained in the liquid in its passage through the uppermost courses, into the liquid in the troughs, and so decreasing the pressure that objectionable blowing of the liquid out of the troughs as the latter discharges into the troughs will be avoided; this method of venting also presenting the advantage of further increasing the diffusion of the gaseous fluid through the liquid. The venting means may be of any desirable construction as for example in the form of perforated plates as shown extending over openings 33 in the walls 13, these plates preferably extending the full width of these walls and perforated throughout their extent, the perforations being of such size and number as to permit of the desired venting without objectionable displacement of the liquid in the troughs above.

As will be understood, the conduit instead of being provided as a tortious passage composed of interconnected conduit portions disposed in vertical series, may be provided in a single length, or formed of conduit portions disposed in a horizontal series and suitably interconnected to form the conduit.

It may be found desirable in practice to provide for the travel of the liquid along the conduit as a swirling, or rotating, spiral, stream, which may be provided for in any suitable way, as for example by providing the inlets, through which the gaseous fluid enters the conduit portions, along one side only of the conduit portions, instead of providing them in series extending crosswise of the conduit portions.

Furthermore, the structure shown may be further modified and altered without departing from the spirit of my invention and the method practiced by other apparatus than that shown and described.

What I claim as new, and desire to secure by Letters Patent, is:

1. Apparatus for the purpose set forth comprising a conduit of tortious form for the flow therethrough of liquid to be treated, said conduit having an inlet and an outlet at its end portions and presenting a vertical series of interconnected conduit portions, a trough into which said outlet opens, means for introducing gaseous fluid, for treating the liquid, into said conduit for flow therealong with the liquid, and means for venting certain of the entrained gaseous fluid from the liquid before it reaches said trough.

2. Apparatus for the purpose set forth comprising a conduit of tortious form for the flow therethrough of liquid to be treated, said conduit having an inlet and an outlet at its end portions and presenting a vertical series of interconnected conduit portions, a trough the bottom of which is formed of the roof of the upper one of said conduit portions and into which said outlet opens, means for introducing gaseous fluid, for treating the liquid, into said conduit for flow therealong with the liquid, and means for venting certain of the entrained gaseous fluid from the liquid before it reaches said trough.

3. Apparatus for the purpose set forth comprising a conduit of tortious form for the flow therethrough of liquid to be treated, said conduit having an inlet and an outlet at its end portions and presenting a vertical series of interconnected conduit portions, a plurality of means for introducing gaseous fluid, for treating the liquid, into said conduit for flow therealong with the liquid, certain of said means being disposed in certain of the bottoms of said conduit portions, walls of said conduit having openings adjacent said means to afford access thereto, and removable closures for said openings.

4. Apparatus for the purpose set forth comprising a conduit of tortious form for the flow therethrough of liquid to be treated, said conduit having an inlet and an outlet at its end portions and presenting a vertical series of interconnected conduit portions, a plurality of means for introducing gaseous fluid, for treating the liquid, into said conduit for flow therealong with the liquid, certain of said means being disposed in certain of the bottoms of said conduit portions, in a substantially vertical series between the ends of said conduit portions, walls of said conduit having openings adjacent said means to afford access thereto through the top of the apparatus, and removable closures for said openings.

RALPH R. LEFFLER.